(12) United States Patent
Pita-Gil

(10) Patent No.: US 10,060,782 B2
(45) Date of Patent: Aug. 28, 2018

(54) METHOD FOR ESTIMATING THE MASS OF A VEHICLE

(71) Applicant: RENAULT s.a.s., Boulogne-Billancourt (FR)

(72) Inventor: Guillermo Pita-Gil, Paris (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 113 days.

(21) Appl. No.: 15/101,253

(22) PCT Filed: Nov. 24, 2014

(86) PCT No.: PCT/FR2014/053008
§ 371 (c)(1),
(2) Date: Jun. 2, 2016

(87) PCT Pub. No.: WO2015/082797
PCT Pub. Date: Jun. 11, 2015

(65) Prior Publication Data
US 2016/0305814 A1    Oct. 20, 2016

(30) Foreign Application Priority Data
Dec. 5, 2013 (FR) ...................................... 13 62176

(51) Int. Cl.
*G01G 19/02* (2006.01)
(52) U.S. Cl.
CPC .................................... *G01G 19/02* (2013.01)
(58) Field of Classification Search
CPC .................................................... G01G 19/02
See application file for complete search history.

(56) References Cited

U.S. PATENT DOCUMENTS

| 7,177,740 B1* | 2/2007 | Guangjun | G01C 1/06 356/139.09 |
|---|---|---|---|
| 2009/0080703 A1* | 3/2009 | Hammerschmidt | G06T 7/0004 382/104 |

(Continued)

FOREIGN PATENT DOCUMENTS

DE    26 40 283 A1    3/1978

OTHER PUBLICATIONS

Srivastava et al., Standoff video analysis for the detection of security anomalies in vehicles, IEEE, 2010.*

(Continued)

*Primary Examiner* — John Breene
*Assistant Examiner* — Mohammad Islam
(74) *Attorney, Agent, or Firm* — Oblon, McClelland, Maier & Neustadt, L.L.P.

(57) ABSTRACT

A method estimates a weight of a motor vehicle including front and rear wheel assemblies, using a smart communication device, after loading of the vehicle. The method includes identifying the vehicle in the smart communication device, using a camera of the smart communication device to capture and process a photograph of at least one wheel with at least one point of the vehicle brought to sink down jointly upon the loading of the vehicle with a suspension of the wheel of the vehicle, determining a clearance of the wheel assembly opposite the photographed wheel, calculating a load value on the wheel assembly of the photographed wheel and a load value on the opposite wheel assembly as a function of the respective clearances of these wheel assemblies, to determine a total load value, and using the smart communication device to inform a user of a load state of the vehicle.

10 Claims, 4 Drawing Sheets

(56) References Cited

U.S. PATENT DOCUMENTS

| | | | | |
|---|---|---|---|---|
| 2011/0257876 A1* | 10/2011 | Yokota | ................ | B60W 40/13 |
| | | | | 701/124 |
| 2011/0267200 A1 | 11/2011 | Reynolds et al. | | |
| 2014/0309845 A1* | 10/2014 | Wittmann | ............... | G01L 17/00 |
| | | | | 701/31.5 |
| 2015/0073744 A1* | 3/2015 | Herrera | .............. | B60W 40/076 |
| | | | | 702/141 |
| 2016/0214620 A1* | 7/2016 | Yang | .................... | B60W 40/13 |

OTHER PUBLICATIONS

International Search Report dated Feb. 9, 2015 for PCT/FR2014/053008 filed on Nov. 24, 2014.
French Search Report dated Jun. 12, 2014 for FR 1362176 filed on Dec. 5, 2013.

* cited by examiner

METHOD FOR ESTIMATING THE MASS OF A VEHICLE

FIELD

The present invention relates in a general way to a method for estimating the total weight of a motor vehicle. More specifically, the invention relates to a method for estimating the total weight of a vehicle after loading.

DESCRIPTION OF THE RELATED ART

A knowledge of the total weight of a motor vehicle is necessary for the correct operation of numerous on-board systems in the vehicle, such as shock absorber systems, underinflation detection systems, engine control systems (for electric, combustion or hybrid engines), hill starting systems, overload detection systems, lighting systems, braking and/or energy recovery systems, and the like.

SUMMARY

The patent application filed under the reference FR-12-57425 discloses a method for estimating the total weight of a vehicle using a smart communication device, in which the optical axis of the camera must coincide with the axis of the center of the wheel. This method requires the user to stoop in order to align the optical axis and the axis of the center of the wheel and therefore makes the operation awkward.

One object of the present invention is to respond to the aforementioned drawback of the prior art document, by proposing a method for estimating the weight of a motor vehicle after loading which will enable the user to detect overloading of his vehicle in a simple way without the need for any particular manipulation of the smart communication device. The invention will also have to propose a method requiring the least computation time.

For this purpose, a first aspect of the invention relates to a method for estimating the weight of a motor vehicle comprising a front wheel assembly and a rear wheel assembly, using a smart communication device, after the loading of the vehicle, the method comprising the steps of: (i) identifying the vehicle in the smart communication device; (ii) using a camera of the smart communication device to capture and process a photograph of at least one wheel with at least one point of the vehicle brought to sink down jointly upon the loading of the vehicle with the suspension of the wheel of the vehicle, after loading, in order to determine the clearance of the wheel assembly of the photographed wheel as a function of the identified vehicle, the taking of a photograph of a wheel is subordinate to maintaining the telephone in a plane at right angles to the plane of the photographed wheel except in the vertical position of the telephone; (iii) determining the clearance of the wheel assembly opposite the wheel photographed in step (ii), either by measuring the angle of inclination of the vehicle after loading, using at least one accelerometer or inclinometer of the smart communication device, or by capturing and processing a photograph of at least one wheel with at least one point of the vehicle brought to sink down jointly upon the loading of the vehicle with the suspension of a wheel of the wheel assembly opposite the wheel assembly of the wheel photographed in step (ii), using the camera of the smart communication device; (iv) using a calculation unit of the smart communication device to calculate the load value on the wheel assembly of the photographed wheel and the load value on the opposite wheel assembly as a function of the respective clearances of these wheel assemblies, so as to determine the total load value of the vehicle; (v) using the smart communication device to inform the user of the load state of the vehicle.

This method for estimating the load of the vehicle can be very rapidly and easily executed by a user in possession of a smart communication device such as an intelligent mobile phone or computerized phone, also known as a "smartphone" in the English terminology, equipped with a suitable application. This solution makes it possible for the user easily to determine the weight of the vehicle, and is reliable because it does not depend on any element in the vehicle. Thus it allows any user to check the load state of his vehicle after loading, and to prevent any risk of overload which may, notably, lead to excess consumption, degraded roadholding, or infringement of the safety regulations for the type of vehicle concerned (notably in terms of the gross vehicle weight rating or GVWR).

Advantageously, the processing of the photograph can comprise at feast one step of calculation of an invariant.

Advantageously, the calculation of the invariant can be a crossratio performed on at least one point of the wheel and at least one point of the vehicle brought to sink down jointly upon the loading of the vehicle with the suspension of the wheel of the vehicle.

According to a variant, step (I) of identifying the vehicle comprises the steps of: (i.1) determining, before loading, the distance between the wheel center and the center of the wheel housing of the wheel to be photographed in step (ii); (i.2) determining the angle of inclination of the vehicle before loading; (i.3) determining the total permissible load of the identified vehicle.

According to an advantageous variant, step (ii) of capturing and processing the image comprises the following substeps of: (ii.0) taking a photograph of a wheel of the vehicle;
(ii.1) converting the captured photograph of the wheel to a grayscale image;
(ii.2) using a first filter of the fuzzy Gaussian type to improve the sharpness of the image;
(ii.3) using a second filter of the Sobel type to obtain the contours of the image;
(ii.4) breaking down the image into two parts, namely a first part relating to the wheel and a second part relating to the wheel housing;
(ii.5) calculating the center and the radius of the wheel housing by the least squares method;
(ii.6) calculating the values of the minimum and maximum radii of the wheel as a function of the radius of the wheel housing and of the identified vehicle;
(ii.7) using a third filter of the Mexican hat wavelet type to improve the concentration of points near the center of the wheel;
(ii.8) calculating the center of the wheel on the basis of the accumulation of points in the wheel center, and calculating the distance after loading between the wheel center and the center of the wheel housing, calculating the crossratio of said at least point of the wheel and of at least one point of the vehicle brought to sink down jointly upon the loading of the vehicle with the suspension of the wheel of the vehicle;
(ii.9) calculating the clearance of the wheel assembly of the photographed wheel, using the difference in distance between the wheel center and the center of the wheel housing after and before loading.

According to another variant of the invention, step (iii) of determining the clearance of the opposite wheel assembly can be based on a measurement of the difference in the angle of inclination before and after loading, the angle of inclination being chosen as the angle between a terrestrial reference frame and a vehicle reference frame along the X axis of the vehicle.

Step (iii) of measuring the angle of inclination, any detection of an acceleration beyond a certain predetermined threshold can be considered to indicate that the smart communication device has been dropped, and step (iii) must be repeated.

Step (iv) of calculating the load value on the front and rear wheel assemblies can be executed by interpolation in a load/clearance map.

Another aspect of the invention relates to a smart communication device configured for the execution of the method according to any one of the preceding claims, characterized in that the smart communication device comprises a programmed application (14) suitable for activating a method for estimating the weight of a vehicle,
a human-machine interface (16) suitable for starting the application for estimating the weight of a vehicle,
means for identifying the vehicle,
a camera (20) suitable for taking a photograph of at least one wheel with at least one point of the vehicle brought to sink down jointly upon the loading of the vehicle with the suspension of the wheel of the vehicle,
at least one accelerometer (22) and/or inclinometer (24) suitable for measuring an angle of inclination between the terrestrial reference frame and the vehicle reference frame,
a calculation unit (12) programmed to execute steps of image processing and calculation of clearance values and load values including at least one step of calculating at least one invariant, and
at least one graphic and/or audio interface (26) suitable for alerting the user to the load state of his vehicle.

BRIEF DESCRIPTION OF THE DRAWINGS

Other features and advantages of the present invention will be more evident from a reading of the following detailed description of an embodiment of the invention, provided by way of non-limiting example and illustrated in the appended drawings, in which.

DETAILED DESCRIPTION

Figure 1:
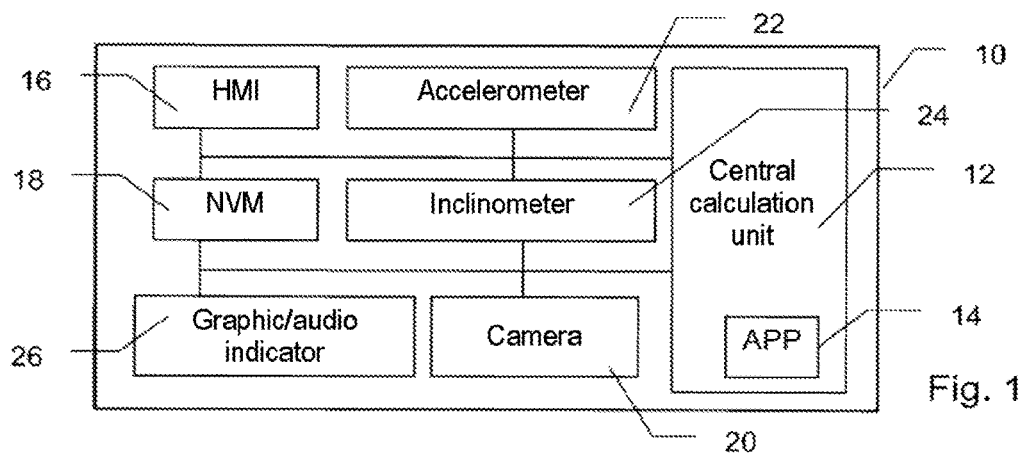
FIG. 1 is a schematic representation of a smart communication device according to an embodiment of the invention.
Figure 8:
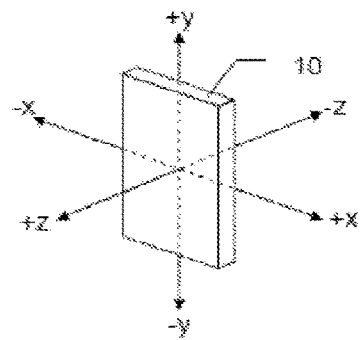
FIG. 8 shows an example of the definition of the axes for a smart communication device.

FIG. 1 is a schematic representation of a smart communication device according to an embodiment of the invention. The smart communication device 10 comprises a programmable central unit 12. An application 14 for estimating the weight of a vehicle is programmed into this central unit 12. A human-machine interface 16 is used to start the application 14 for estimating the weight of a vehicle. Means for identifying the vehicle are provided, for example, in the form of the selection, via the human-machine interface 16, of a vehicle model from a list of models recorded previously in a non-volatile memory 18. A camera 20 is also provided, for taking a photograph of at least one wheel of the vehicle, together with at least one accelerometer 22 and/or an inclinometer 24 for measuring the angle of inclination of the smart communication device, the central unit 12 being programmed to execute steps of image processing and calculation of clearance values and load values. At least one graphic and/or audio interface 26 is also provided, to alert the user to the load state of his vehicle. This graphic and/or audio interface 26 may be partially or completely connected to the human-machine interface 16. For information, the axes x, y and z as generally defined for a communication device of this kind are shown in FIG. 8.

Figure 2:
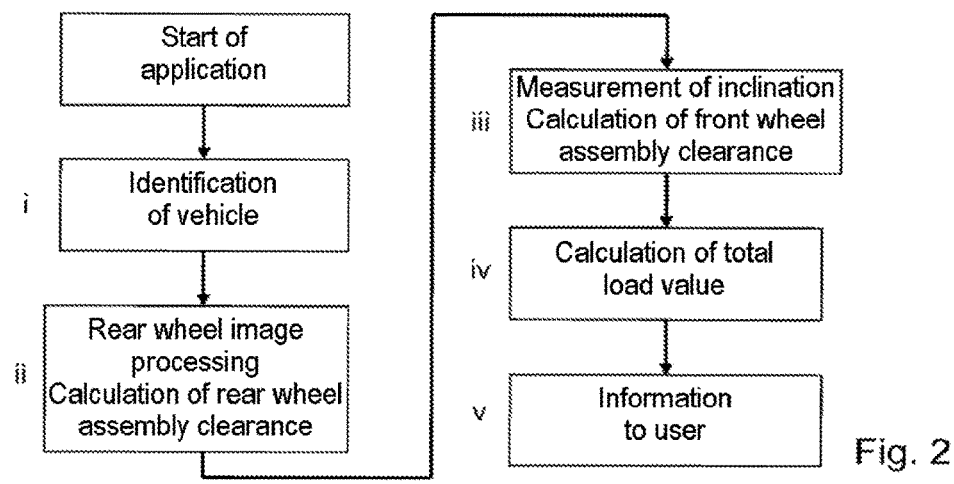
FIG. 2 shows a diagram of the method for estimating the weight of a vehicle according to an embodiment of the invention.

FIG. 2 shows a diagram of the method for estimating the weight of a vehicle according to an embodiment of the invention. A preliminary step is that of starting the application for estimating the load of a vehicle.

When the application has been started, the user must identify his vehicle in a first step (i) so that the weight of the vehicle can be estimated. For this purpose, he may, for example, be invited via the human-machine interface to select his vehicle model from a previously recorded list. The previously recorded vehicle model must include at least the information relating to the distance between the wheel center and the center of the wheel housing of the wheel to be photographed (step i.1), together with the total permissible load for this model of vehicle (step i.3). Alternatively, the distance between the wheel center and the center of the wheel housing of the wheel to be photographed (step i.1) may be determined manually by taking a photograph of a wheel of the vehicle before loading, the subsequent processing of which will be similar to that explained in detail in FIG. 4 in respect of steps (ii.1) to (ii.8). Additionally, the identification of the vehicle may include the determination of an angle of inclination of the vehicle before its loading (step i.2). This measurement of inclination will preferably be made along the X axis of the vehicle, that is to say along the longitudinal axis of the vehicle, between the terrestrial reference frame (based on gravity) and the vehicle reference frame (based on the vehicle). To this end, the smart communication device will preferably be positioned in a location in the vehicle provided for this purpose, for example in the form of a docking station having a known orientation.

In a second step (ii), the user is invited to take a photograph of at least one wheel of his vehicle after loading. Preferably, the user is invited to take a photograph of a wheel located at the load space end. Thus, for most vehicles, the load space is located at the rear of the vehicle, and the user will therefore be invited to take a photograph of a rear wheel of his vehicle. This photograph is then processed by an image processing method described in detail with reference to FIG. 4. On the basis of the image processing that is executed, the application determines the clearance of the wheel assembly of the photographed wheel, which, as a general rule, will be the clearance of the rear wheel assembly.

In a third step (iii), the user preferably positions the smart communication device in his docking station to make at least one measurement of the inclination of the vehicle along the X axis between the terrestrial reference frame and the vehicle reference frame after the loading of the vehicle. For this purpose, provision is made to position the communication device correctly in its location, to ensure that the measured inclination is indeed the inclination along the X axis of the vehicle. If a similar measurement has been made before loading, during the identification of the vehicle, it will be possible to calculate the precise difference in inclination before and after loading, so as to compensate for any gradient in the ground on which the vehicle is parked while being loaded. On the basis of the inclination measured after loading, and advantageously both before and after loading, the application determines the clearance of the wheel assembly opposite that of the photographed wheel, for example the front wheel assembly.

In a fourth step (iv), the application calculates the load value on the front and rear wheel assemblies of the vehicle, from which it deduces the total load value of the vehicle by adding the two loads together. This total load value can then be displayed by the communication device.

In a fifth step (v), the application operates the graphic and/or audio interface of the communication device to alert the user to the load state of his vehicle. Thus, for example, the communication device displays a red alert if the weight is more than 0.95*maxweight, where "maxweight" is a calibration constant corresponding to the maximum permitted load. The device displays a yellow alert if the weight is in the range from 0.8*maxweight to 0.95*maxweight. The device displays a green alert if the weight is below 0.8*maxweight. The levels 0.8 and 0.95 are two thresholds which are also calibration parameters. Clearly, they may be modified to meet requirements. The number of alert levels may be variable and may depend on the type of application. It is also possible to display the probability of overload, or the load and the confidence level at 95% or 99%, for example.

Figure 3:
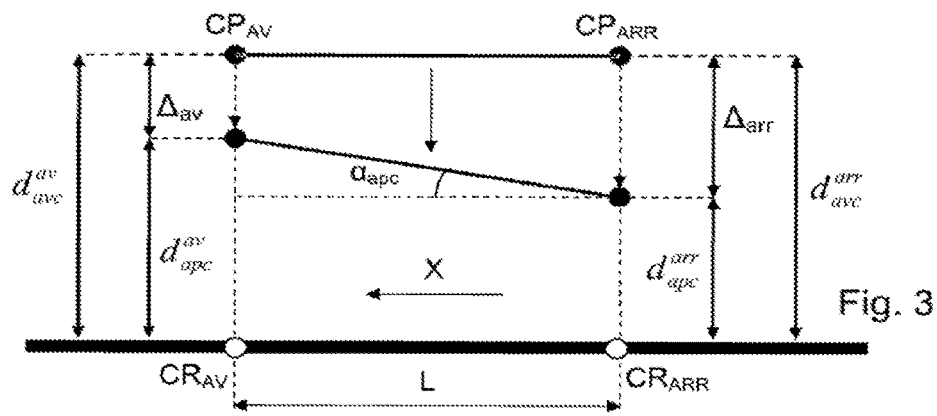
FIG. 3 is a schematic representation of the clearance of the front and rear wheel assemblies after the loading of the vehicle.

FIG. 3 is a schematic representation of the clearance of the front wheel assembly $\Delta_{AV}$ and rear wheel assembly $\Delta_{ARR}$ after the loading of the vehicle. In the example shown in the figure, the vehicle is parked on horizontal ground. The vehicle is represented schematically by two points representing the front wheel center $CR_{AV}$ and rear wheel center $CR_{ARR}$ of the vehicle, and by the front wheel housing center $CP_{Av}$ and the rear wheel housing center $CP_{ARR}$ of the vehicle, these points being used to determine the clearances of the wheel assemblies of the vehicle. However, it will be evident that points on the vehicle other than the centers of the wheel housings can be considered, where these other points are subject to being pushed inward together with the wheel suspension when the vehicle is loaded. The distance between the front wheel center $CR_{Av}$ and rear wheel center $CR_{ARR}$ of the vehicle is the wheelbase L of the vehicle.

Additionally, the term "clearance" will generally be taken to mean the distance corresponding to the vertical oscillation of an axle with respect to the chassis, due to the flexibility of the suspension during loading. In the remainder of this example, the clearance will signify the vertical oscillation of the center of the wheel housing with respect to the corresponding wheel center.

Before loading, the identification makes it possible, notably, to determine the distance at the rear before loading $d_{avc}^{arr}$ between the wheel center $CR_{ARR}$ and the wheel housing center $CP_{ARR}$, particularly in the case where the load space is located at the rear of the vehicle, and, if required, the angle of inclination along the X axis of the vehicle between the terrestrial reference frame and the vehicle reference frame, if this angle is not zero. This measurement may be automatically made and recorded by the smart communication device if the latter detects a non-zero inclination during the initial identification step.

During step (iii), which is detailed below with reference to FIG. 4, the communication device determines the distance at the rear after loading $d_{apc}^{arr}$, between the wheel center $CR_{ARR}$ and the center of the wheel housing $CP_{ARR}$ which has been pushed inwards.

During step (iv), the communication device calculates the clearance of the wheel assembly opposite the photographed wheel, that is to say the front wheel assembly in the present example. To this end, the communication device is preferably placed in the docking station provided for this purpose in the vehicle. When the communication device is in the predetermined position, it can make a measurement of the inclination of the vehicle either automatically or manually (that is to say, by the user's action). Thus, for example, during three seconds the communication device averages the three components measured by its accelerometer. The values gxiPh, gyiPh and gziPh are obtained. If the communication device falls down during the three seconds of measurement, at least one of the acceleration components exceeds 1.5 g, and it is then considered that the device has moved and the measurement will have to be repeated. The same procedure can be followed if one of the angular velocities exceeds the threshold of 0.1 rad/s in absolute value. Advantageously, the communication device displays a progress bar during the measurement. During this measurement, it must also check that the communication device is being held in the correct direction, which may be indicated by a negative value of the parameters gyiPh and gziPh.

When the calculation has finished, the communication device estimates the angle of inclination after loading $\alpha_{apc}$ along the X axis of the vehicle between the terrestrial reference frame and the vehicle reference frame, by calculating, for example:

$$\alpha_{apc}=0.5(\alpha\ \cos|gyiPh|)+\alpha\ \sin(|gziPh|))$$

The communication device then deduces the distance at the front $d_{apc}^{av}$, after loading between the wheel center $CR_{AV}$ and the wheel housing center $CP_{AV}$ which has been pushed inwards, using the following formula:

$$d_{apc}^{av}=d_{apc}^{arr}+L.\tan(\alpha_{apc})$$

If the gradient of the ground is to be taken into account, the following general formula may be used:

$$d_{apc}^{av}=d_{apc}^{arr}-L.\tan(\Delta\alpha)$$

where $\Delta\alpha=\alpha_{avc}-\alpha_{apc}$, $\alpha_{avc}$ being the inclination before loading, defined during the identification of the vehicle. L is the wheelbase of the vehicle, also defined during the identification of the vehicle.

Figure 4:
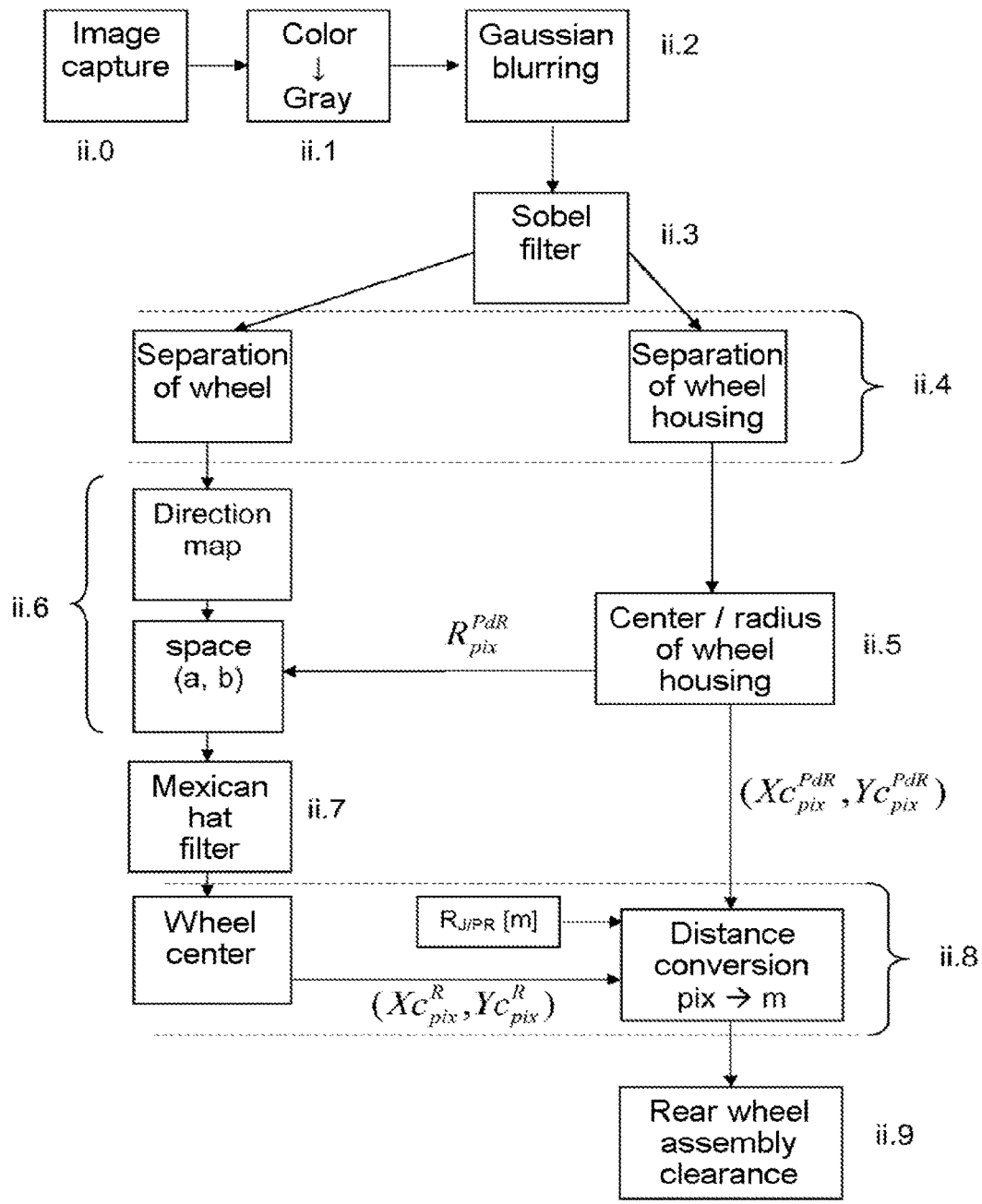
FIG. 4 shows a detailed diagram of the step of image processing according to an embodiment of the invention.

FIG. 4 shows a detailed diagram of step (ii) of image capture and processing according to a preferred embodiment of the invention.

Figure 5:
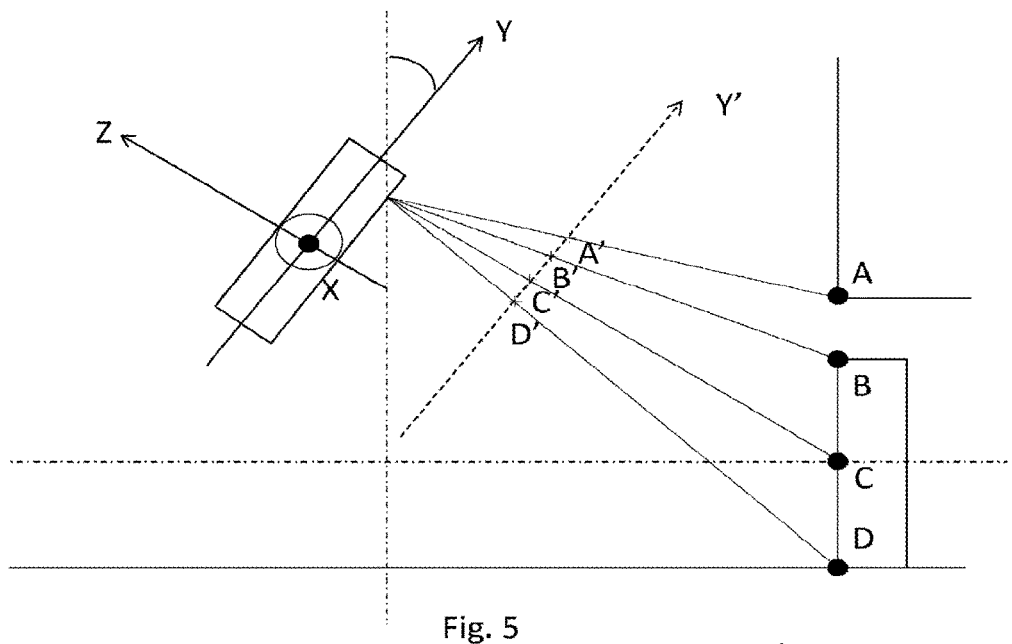
FIG. 5 is a schematic representation of the acquisition by the smart communication device of an image according to an embodiment of the invention.

As mentioned above, the user is invited by the application to take a photograph (step ii.0) of at least one wheel of his vehicle, for example a rear wheel. The photograph is taken in conditions such as shown in FIG. 5, that is to say when the measurements of the accelerometers contained in it indicate an x component close to zero, a z component of less than zero and a y component of less than zero (the telephone is not upside down). Components x, y and z of the smart communication device are shown in FIGS. 5 and 8.

An illuminated and/or audible and/or vibration signal may inform the user that these conditions are present, so that he can initiate the photograph capture. In a variant, automatic capture of the photograph may be provided when the conditions are met.

Figure 6A:
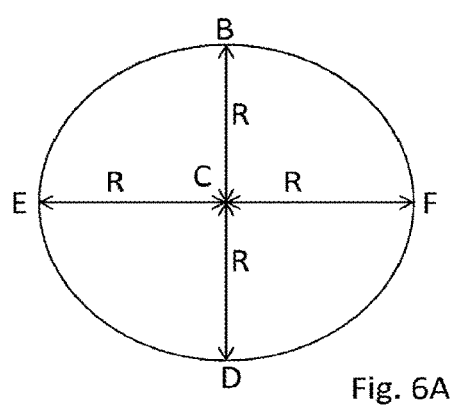
FIGS. 6A-6B represent an image of the wheel as in two different situations.
Figure 6B:
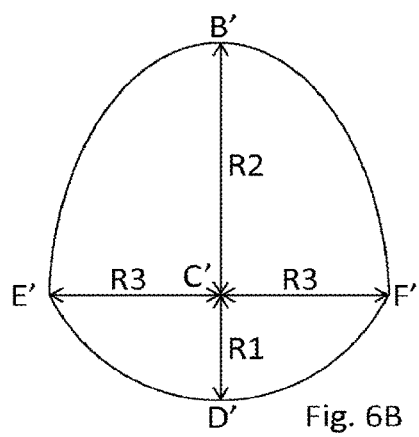

Two cases then arise:
- the case in which the component z is almost zero (not represented, condition in which the communication device is in a vertical position), then the image acquired is that represented in FIG. 6A, this configuration makes it possible to have a direct measurement of the distances between the different points after processing of the image, that forces the user to align the optical axis of the camera with that of the center of the wheel,
- the case in which the component z>0 (FIG. 5), then the image acquired is that represented in FIG. 6B, this configuration introduces a distortion of the acquired image and consequently does not make it possible to have a direct measurement, this situation is a situation that is more ergonomic for the user because the photograph can be taken standing.

As represented in FIG. 5, the acquisition of an image comprising at least one point A of the vehicle brought to sink down jointly upon the loading of the vehicle with the suspension of the wheel of the vehicle and several points of the wheel B, C, D, E, F (the points E and F not being represented in FIG. 5 for reasons of clarity) is done on a plane y', which is the focal plane of the camera 20. The plan y' is not parallel to the vertical plane on which the points are aligned which induces the effect of distortion of the image, as represented in FIG. 6B. The points acquired in this way, on the plane y', are instantiated B', C', D', E', F' in FIG. 6B.

The communication device then commences the processing of the photograph of the rear wheel taken by the user, enabling the clearance of the corresponding suspension to be calculated. When the photograph has been taken, if the communication device does not allow the grayscale photograph to be taken directly, the photograph is converted to grayscale (step ii.1, only if necessary). This conversion may be carried out, for example, with the following weights applied at each RGB level of the signal:

gray_image=0.3*photo_red+0.59*photo_green+ 0.11*photo_blue;

where photo_red is the red luminous intensity, photo_green is the green luminous intensity, and photo_blue is the blue luminous intensity. When the image has been converted to grayscale, the processing starts with blurring of the image with a Gaussian filter (step ii.2). This processing enables artificial image gradients, defects, and the like to be reduced.

"Sobel" filtering is then applied (step ii.3) to calculate the derivative of the image in the direction of the width and of the height, and then in both directions combined. This processing enables the contours present in the image to be obtained.

The image is then broken down into two parts, namely the wheel housing and the wheel (step ii.4).

For the separated wheel housing, the circle containing the points forming the contour is calculated by the least squares method (step ii.5). Thus the center $(xc_{pix}^{PdR}, Yc_{pix}^{PdR})$ and the radius $R_{pix}^{PdR}$ of the wheel housing in pixels are found. Point A' is thus deducted.

For the separated wheel, the first stage is the calculation of the direction map, which is a matrix containing the directions normal to the intensity gradient calculated during the Sobel filtering. The points in the direction indicated by this vector, the distance of which varies from r_min to r_max, are then cumulated in the image. These values r_min and r_max are calculated (step ii.6) using the value of the radius $R_{pix}^{PdR}$ of the wheel housing estimated in the preceding step in pixels and the theoretical ratio $R_{J/PR}$ (known) between the rim radius and the radius of the wheel housing. Points B', D' are thus deducted.

The processing is continued by filtering the resulting image with a Mexican hat filter or a Mexican hat wavelet filter (step ii.7), similar to a cardinal sine. This makes it possible to improve the concentration of points near the center of the wheel.

The center of the wheel $(Xc_{pix}^{R}, Yc_{pix}^{R})$ is then calculated (step ii.8) on the basis of the accumulation of points in the wheel center. Point C' is thus deducted.

In the context of the present invention, other forms of image processing may be used to define both the wheel center and the wheel housing center.

At this stage, it is possible to know the value of the clearance C'A' with the distortion except that this value is not the real value of the clearance. For this, the crossratio, theory of invariants in Euclidean geometry, is applied.

An invariant of a given transformation is a property which remains unchanged if the transformation concerned is applied one or more times. For example, in the context of Euclidean geometry, the distance is an invariant relative to a transformation of rotation or translation type. Similarly, the angle is also an invariant in Euclidean geometry relative to translations and rotations.

In the context of the algebra of transformations of projection type, one of the invariants is the crossratio. Take 4 aligned points $P_1$, $P_2$, $P_3$ and $P_4$, the crossratio is defined as:

$$\beta(P_1, P_2, P_3, P_4) = \frac{\overline{P_1P_3} \cdot \overline{P_2P_4}}{\overline{P_1P_4} \cdot \overline{P_2P_3}}$$

The crossratio that has just been defined above will now be used. By expressing its value in the projected image and in the plane of the wheel, the following is obtained:

$$\begin{cases} \beta(D', C', B', A') = \dfrac{\overline{D'B'} \cdot \overline{C'A'}}{\overline{D'A'} \cdot \overline{C'B'}} \\ \beta(D, C, B, A) = \dfrac{\overline{DB} \cdot \overline{CA}}{\overline{DA} \cdot \overline{CB}} \end{cases}$$

Furthermore, the crossratio is known to be an invariant of the transformations of projection type hence:

$$\beta(D',C',B',A') = \beta(D,C,B,A)$$

Therefore, $$\frac{\overline{D'B'} \cdot \overline{C'A'}}{\overline{D'A'} \cdot \overline{C'B'}} = \frac{\overline{DB} \cdot \overline{CA}}{\overline{DA} \cdot \overline{CB}}$$

The crossratio β(D', C', B', A') is calculated and will be called P. It is also known that $\overline{DB}=2R$, that $\overline{CB}=R$ and that $\overline{DA}=2R+\overline{CA}$. Which gives the following equation:

$$P = \frac{2R \cdot \overline{CA}}{(R+\overline{CA}) \cdot R}$$

Which finally makes it possible to find the distance between the center of the wheel and the high point of the wheel passage on the plane of the wheel:

$$\overline{CA} = \frac{PR}{2-P}$$

The calculation of the crossratio is particularly advantageous because it does not require any excessively significant calculation time, contrary to other image processing methods comprising distortion.

To complete the processing, the distance in pixels between the wheel center and the wheel housing center is calculated, after which it is converted into meters, using the ratio between the radius of the wheel housing in pixels and in meters (the theoretical radius).

Figure 7A:
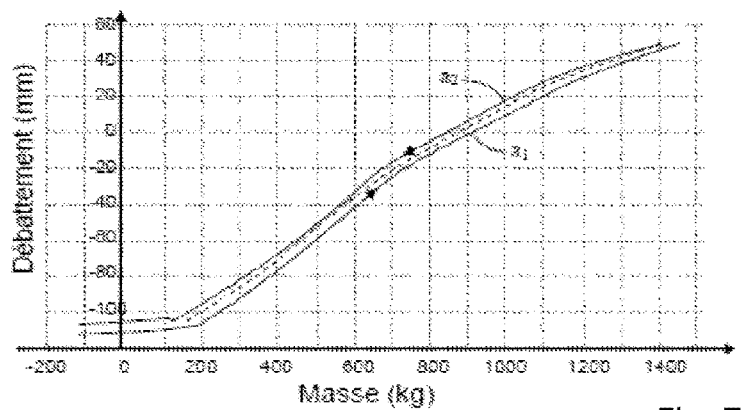
FIG. 7A shows an example of the load/clearance relationship for a wheel suspension for a predetermined vehicle model.
Figure 7B:
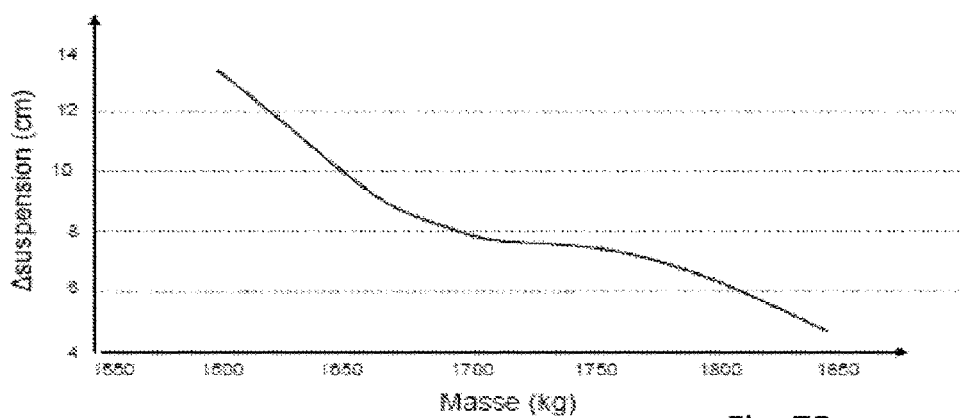
FIG. 7B shows the experimental results of the determination of the total load of a vehicle.

The experimental results are shown in FIG. 7B. The result of the calculations is the distance $d_{apc}^{arr}$ between the wheel center and the wheel housing center after loading. This distance decreases with an increase in the loading of the vehicle.

Therefore, an initial step of calibration in the factory makes it possible to plot a map showing this distance $d_{apc}^{arr}$ as a function of a known weight of the vehicle, and subsequently to determine this weight by estimating $d_{apc}^{arr}$.

More advanced versions of the application can be imagined, in which the user is requested to photograph both rear wheels in order to calculate a distance $d_{apc}^{arr}$ which is the average of the two wheels.

However, in order to allow for ageing, and notably the phenomena of creep in the linkage between the chassis and the suspensions, the application subsequently deduces (step ii.9) the clearance of the rear wheel assembly by performing the following operation $$\Delta d_{arr} = d_{avc}^{arr} - d_{apc}^{arr}$$

where $d_{acv}^{arr}$ represents the front distance before loading (in the empty state). This value will be deduced during the stage of vehicle identification: for example, either by asking the user to photograph the vehicle in the empty state, or by accessing a database and interrogating it with the vehicle identifier.

The user may also be requested to photograph the vehicle regularly in the empty state (once or twice a year, for example), in order to allow for variations in this empty distance, due essentially to the ageing of the various members of the suspension.

FIG. 7A shows an example of the load/clearance relationship of a wheel suspension for a predetermined vehicle model. The rear clearance value found on completion of processing step (ii) can be used during the step to calculate, by interpolation in a map (such as that shown in FIG. 7A, for example), the value of the loading on the rear wheel assembly.

This figure exhibits hysteresis: when the vehicle is progressively loaded, the clearance follows the curve $a_1$, whereas the relationship follows the curve $a_2$ when the vehicle is unloaded.

To limit the uncertainties, the median curve, shown as a broken line, is used.

According to another embodiment of the invention, the user is requested to photograph the four wheels of the vehicle, enabling the precision of the weight estimation to be increased, notably by improving the evaluation of the loading conditions.

The photographing of each of the wheels and the image processing as defined, or any other image processing that results in the determination of the wheel centers and wheel housing centers, then enables the clearance of each wheel to be determined for each wheel assembly. During the identification of the vehicle, if it is specified that the clearance of each wheel is to be determined, making it necessary to photograph each of the wheels, it is no longer necessary to determine the angles of longitudinal and transverse inclination of the vehicle, since the unloaded clearance of each wheel is then solely dependent on the known characteristics of the vehicle, and on the gradient of the road, which can therefore be easily determined, by interpolation of the known clearances on flat ground, for example.

A simplified variant is that of measuring only one of the wheels in each wheel assembly for the determination of the clearance of the wheel assemblies.

Clearly, various modifications and/or improvements which will be evident to those skilled in the art may be made to the different embodiments of the invention described in the present description, without departing from the scope of the invention defined by the attached claims.

Notably, the identification of the vehicle may be used on the use of the VIN (for "Vehicle Identification Number"), which is the unique alphanumeric code assigned to each vehicle. If the VIN is used, the parameters required for the various calculations can be obtained from a central server.

This VIN could be obtained by a request sent by the smart communication device to the vehicle, for example via the OBD (On Board Diagnostic) diagnostic interface, and the response could then be transmitted in its turn to a database, which would return the parameters required for the various calculations.

Additionally, in order to improve the precision of the device, during the vehicle identification step (step (iii)), in which the user is requested to position the smart communication device in his docking station to make at least one measurement of the inclination of the vehicle along the X axis between the terrestrial reference frame and the vehicle reference frame before the loading of the vehicle, provision is also advantageously made to determine the inclination along the Y axis of the vehicle (the transverse inclination) in order to correct the subsequent determination of the distance between the wheel housing center and the wheel center for this inclination.

Advantageously, provision is also made, during the determination of the inclination after loading along the X axis, to determine the inclination along the Y axis, this determination being advantageously coupled with the measurement of a single wheel of each wheel assembly.

Thus the difference in inclination is measured with even greater precision.

The inclination of the vehicle along the Y axis may be due to the banking of the ground, or may occur when the vehicle is parked with one of the wheels, or both wheels on one side, placed on a sidewalk, while the other two wheels are on the road.

The invention claimed is:

1. A method for estimating a weight of a motor vehicle including a front wheel assembly and a rear wheel assembly, using a smart communication device, after loading of the vehicle, the method comprising:
   (i) identifying the vehicle in the smart communication device;
   (ii) using a camera of the smart communication device to capture and process a photograph of at least one wheel with at least one point of the vehicle brought to sink down jointly upon the loading of the vehicle with a suspension of the wheel of the vehicle, after loading, in order to determine a clearance of the wheel assembly of the photographed wheel as a function of the identified vehicle, the taking of the photograph of the wheel is subordinate to keeping the smart communication device in a plane at right angles to a plane of the photographed wheel except in a vertical position of the smart communication device;
   (iii) measuring an angle of inclination of the vehicle after loading, using at least one accelerometer or inclinometer of the smart communication device that captured and processed the photograph, the angle of inclination being an angle between a longitudinal axis of a terrestrial reference frame and a longitudinal axis of a vehicle reference frame, and determining a clearance of the wheel assembly opposite the wheel photographed in step (ii) based on the angle of inclination of the vehicle;
   (iv) using a calculation unit of the smart communication device to calculate a load value on the wheel assembly of the photographed wheel and a load value on the opposite wheel assembly as a function of the respective clearances of these wheel assemblies, to determine a total load value of the vehicle; and
   (v) using the smart communication device to inform a user of a load state of the vehicle.

2. The method for estimating the weight of the motor vehicle as claimed in claim 1, wherein the processing of the photograph includes at least one step of calculating an invariant.

3. The method for estimating the weight of the motor vehicle as claimed in claim 2, wherein the calculating the invariant is a crossratio performed on at least one point of the wheel and at least one point of the vehicle brought to sink down jointly upon the loading of the vehicle with the suspension of the wheel of the vehicle.

4. The method for estimating the weight of the motor vehicle as claimed in claim 1, wherein step (i) includes:
   (i.1) determining, before loading, a distance between a wheel center and a center of a wheel housing of the wheel to be photographed in step (ii);
   (i.2) determining the angle of inclination of the vehicle before loading; and
   (i.3) determining a total permissible load of the identified vehicle.

5. The method for estimating the weight of the motor vehicle as claimed in claim 1, wherein step (ii) includes:
   (ii.0) taking the photograph of the wheel of the vehicle;
   (ii.1) converting the captured photograph of the wheel to a grayscale image;
   (ii.2) using a first filter of a fuzzy Gaussian type to improve a sharpness of the image;
   (ii.3) using a second filter of a Sobel type to obtain contours of the image;
   (ii.4) breaking down the image into two parts, including a first part relating to the wheel and a second part relating to a wheel housing;
   (ii.5) calculating a center and a radius of the wheel housing by a least squares method;
   (ii.6) calculating values of minimum and maximum radii of the wheel as a function of the radius of the wheel housing and of the identified vehicle;
   (ii.7) using a third filter of a Mexican hat wavelet type to improve a concentration of points near a center of the wheel;
   (ii.8) calculating the center of the wheel on the basis of an accumulation of points in the wheel center, calculating a distance after loading between the wheel center and the center of the wheel housing, calculating a crossratio of said at least point of the wheel and of at least one point of the vehicle brought to sink down jointly upon the loading of the vehicle with the suspension of the wheel of the vehicle; and
   (ii.9) calculating the clearance of the wheel assembly of the photographed wheel, using a difference in distance between the wheel center and the center of the wheel housing after and before loading.

6. The method for estimating the weight of the motor vehicle as claimed in claim 1, wherein step (iii) is based on a measurement of a difference in the angle of inclination before and after loading.

7. The method for estimating the weight of the motor vehicle as claimed in claim 6, wherein, during the measuring the angle of inclination in step (iii), any detection of an acceleration beyond a certain predetermined threshold is considered to indicate that the smart communication device has been dropped and that step (iii) must be repeated.

8. The method for estimating the weight of the motor vehicle as claimed in claim 1, wherein step (iv) is executed by interpolation in a load/clearance map.

9. The method for estimating the weight of the motor vehicle as claimed in claim 1, wherein step (i) includes identifying the vehicle selected from a list of models previously recorded in a non-volatile memory, the previously recorded list of models includes:
   at least a distance information between a wheel center and a center of a wheel housing of the wheel to be photographed in step (ii); and
   a total permissible load information of the identified vehicle.

10. A smart communication device, comprising:
    a programmed application to activate a method for estimating the weight of a vehicle;
    a human-machine interface to start the application for estimating the weight of a vehicle;
    a camera to take a photograph of at least one wheel with at least one point of the vehicle brought to sink down jointly upon the loading of the vehicle with a suspension of the wheel of the vehicle;
    at least one accelerometer and/or inclinometer to measure an angle of inclination between a terrestrial reference frame and a vehicle reference frame;
    a processor configured to process the image and calculate clearance values and load values including calculating at least one invariant; and
    at least one graphic and/or audio interface to alert a user to a load state of the vehicle.

* * * * *